United States Patent
Sakamoto et al.

(10) Patent No.: US 12,529,331 B2
(45) Date of Patent: Jan. 20, 2026

(54) MOTOR-GENERATOR, POWER GENERATION APPARATUS, AND MOBILITY DEVICE

(71) Applicant: DENSO CORPORATION, Kariya (JP)

(72) Inventors: Akira Sakamoto, Kariya (JP); Keisuke Kawai, Kariya (JP); Yuichi Handa, Kariya (JP); Syuya Kamizono, Kariya (JP)

(73) Assignee: DENSO CORPORATION, Kariya (JP)

( * ) Notice: Subject to any disclaimer, the term of this patent is extended or adjusted under 35 U.S.C. 154(b) by 215 days.

(21) Appl. No.: 18/368,258

(22) Filed: Sep. 14, 2023

(65) Prior Publication Data

US 2024/0003291 A1 Jan. 4, 2024

Related U.S. Application Data

(63) Continuation of application No. PCT/JP2022/007877, filed on Feb. 25, 2022.

(30) Foreign Application Priority Data

Mar. 16, 2021 (JP) .................................. 2021-042790

(51) Int. Cl.
  *F02B 63/04* (2006.01)
  *F16D 3/12* (2006.01)
  (Continued)

(52) U.S. Cl.
  CPC ........... *F02B 63/042* (2013.01); *H02K 1/187* (2013.01); *H02K 1/28* (2013.01); *H02K 7/1815* (2013.01);
  (Continued)

(58) Field of Classification Search
  CPC ........ F02B 63/042; H02K 1/187; H02K 1/28; H02K 7/1815; H02K 21/222; H02K 1/2786; H02K 7/003; H02K 7/00; H02K 7/18; F16D 3/12; F16D 2300/22; B60K 6/26; B60K 6/485
  See application file for complete search history.

(56) References Cited

U.S. PATENT DOCUMENTS

2017/0203754 A1 7/2017 Kawai et al.
2020/0028420 A1 1/2020 Kameyama

FOREIGN PATENT DOCUMENTS

JP S54-133282 U 9/1979
JP S62-141940 A 6/1987
(Continued)

OTHER PUBLICATIONS

English translation of JP-2011074965-A (Year: 2011).*
(Continued)

*Primary Examiner* — Tulsidas C Patel
*Assistant Examiner* — Joshua Kiel M Rodriguez
(74) *Attorney, Agent, or Firm* — Oliff PLC

(57) ABSTRACT

In a motor-generator configured to use no flywheel connection to an internal combustion engine, an inner stator is provided. An outer rotor is arranged to surround the inner stator. The outer rotor is connected to the internal combustion engine without a flywheel and is configured to reduce noise due to at least one of torque ripples of the internal combustion engine and rotational fluctuations of the motor-generator.

11 Claims, 4 Drawing Sheets

(51) Int. Cl.
  *H02K 1/18* (2006.01)
  *H02K 1/28* (2006.01)
  *H02K 7/18* (2006.01)
  *H02K 21/22* (2006.01)

(52) U.S. Cl.
  CPC ............. *H02K 21/222* (2013.01); *F16D 3/12* (2013.01); *F16D 2300/22* (2013.01)

(56) References Cited

FOREIGN PATENT DOCUMENTS

| JP | 2011-074965 A | 4/2011 | | |
|---|---|---|---|---|
| JP | 2011-234555 A | 11/2011 | | |
| WO | WO-2004001932 A1 | * | 12/2003 | ........... H02K 7/1815 |

OTHER PUBLICATIONS

Schneider & Rinderknecht, "System Loss Measurement of a Novel Outer Rotor Flywheel Energy Storage System," Aug. 5, 2019, 2019 IEEE International Electric Machines & Drives Conference (IEMDC), 1379-1385 (Year: 2019).*
Liu et al., "A wind turbine simulator considering various moments of inertia using a DC motor," Aug. 7, 2014, 2014 International Symposium on Power Electronics, Electrical Drives, Automation and Motion, 866-870 (Year: 2014).*
English translation of JP-2011234555-A (Year: 2011).*
English translation of WO-2004001932-A1 (Year: 2003).*

* cited by examiner

MOTOR-GENERATOR, POWER GENERATION APPARATUS, AND MOBILITY DEVICE

CROSS-REFERENCE TO RELATED APPLICATION

The present application is a bypass continuation application of a currently pending international application No. PCT/JP2022/007877 filed on Feb. 25, 2022 designating the United States of America, the entire disclosure of which is incorporated herein by reference, the internal application being based on and claiming the benefit of priority of Japanese Patent Application No. 2021-042790 filed on Mar. 16, 2021. The disclosure of the Japanese Patent Application No. 2021-042790 is incorporated in its entirety herein by reference.

TECHNICAL FIELD

The present disclosure relates to motor-generators to be connected to an internal combustion engine of, for example, a vehicle, power generation apparatuses each equipped with such a motor-generator, and mobility devices each equipped with such a motor-generator.

BACKGROUND

Japanese Patent Publication No. 6372493 discloses a technological measure for reducing simultaneously both a muffled noise and a rattling noise using first and second motors connected to an internal combustion engine of a vehicle. The muffled noise is generated due to vibrations of the power transmission path of the internal combustion engine excited by torque ripples of the internal combustion engine. The rattling noise is generated due to collisions between gears coupled to, for example, the first and second motors through backlash between the gears.

Specifically, the technological measure disclosed in the published patent publication absorbs some levels of the torque ripples of the internal combustion engine using a torsional damper, and thereafter causes one of the first and second motors to perform ripple-compensation control and the other thereof to push the gears to each other. This makes it possible to reduce simultaneously both the muffled noise and the rattling noise.

SUMMARY

A typical vehicle is configured such that a flywheel is connected to one end of a crankshaft, and a motor-generator is connected to an internal combustion engine via the flywheel. The flywheel stores rotational power generated in the internal combustion engine and transferred to the crankshaft, and supplies the rotational power to driving wheels of the vehicle. The flywheel also assists rotation of the crankshaft of the internal combustion engine using inertia force thereof.

On the other hand, a technology related to a so-called "flywheel-less connection", which represents connection between an internal combustion engine and a motor-generator through no flywheel, is useful as a means for reduction in size and weight of, for example, a vehicular drive system comprised of the internal combustion engine and the motor-generator.

Such a drive system, which employs the flywheel-less connection, tries to compensate for torque ripples using the technological measure disclosed in the published patent publication. This however may need to generate large torque for compensating for the torque ripples, resulting in the motor-generator becoming larger in size. This therefore may make difficult installation of the motor-generator in a vehicle.

In view of the circumstances set forth above, one aspect of the present disclosure seeks to provide a technology that achieves both reduction in size of a motor-generator employing flywheel-less connection and reduction in noise.

A first exemplary measure of the present disclosure is a motor-generator configured to use no flywheel connection to an internal combustion engine. The motor-generator includes an inner stator, and an outer rotor arranged to surround the inner stator. The outer rotor is connected to the internal combustion engine without a flywheel. The outer rotor servers as alternative to the flywheel and is configured to reduce noise due to at least one of torque ripples of the internal combustion engine and rotational fluctuations of the motor-generator.

The disclosing persons of the present disclosure have found, based on the results of our earnest studies, that an increase in rotor inertia, which serves as inertia moment of a rotor of a motor-generator, enables rotational fluctuations of the motor-generator to be reduced.

The disclosing persons of the present disclosure have inspired, based on the above findings, that adjustment of the rotor inertia enables reduction of noise due to torque ripples and/or rotational fluctuations of the engine, making it possible to establish flywheel-less connection between the engine and the motor-generator. The disclosing persons have therefore completed, based on the above inspiration, the present disclosure.

The motor-generator according to the first exemplary measure of the present disclosure includes the inner stator and the outer rotor. The outer rotor of the motor-generator serves as an alternative to a flywheel and is configured to reduce noise due to torque ripples of the internal combustion engine and/or rotational fluctuations of the motor-generator. The above configuration of the motor-generator, which is comprised of the outer rotor serving as an alternative to a flywheel in place of an inner rotor, enables adjustment of inertia of the outer rotor to prevent its size from being excessively larger even if the outer rotor has upsized to ensure a sufficient level of the inertia thereof. The motor-generator of the first exemplary measure, which employs flywheel-less connection, therefore achieves both reduction in size and reduction in noise.

A second exemplary measure of the present disclosure is a power generator that includes a motor-generator according to the first exemplary measure. A third exemplary measure of the present disclosure is a mobility device that includes a motor-generator according to the first exemplary measure.

BRIEF DESCRIPTION OF THE DRAWINGS

Other aspects of the present disclosure will become apparent from the following description of an embodiment with reference to the accompanying drawings in which.

DETAILED DESCRIPTION OF EMBODIMENTS

First Embodiment

Figure 1:
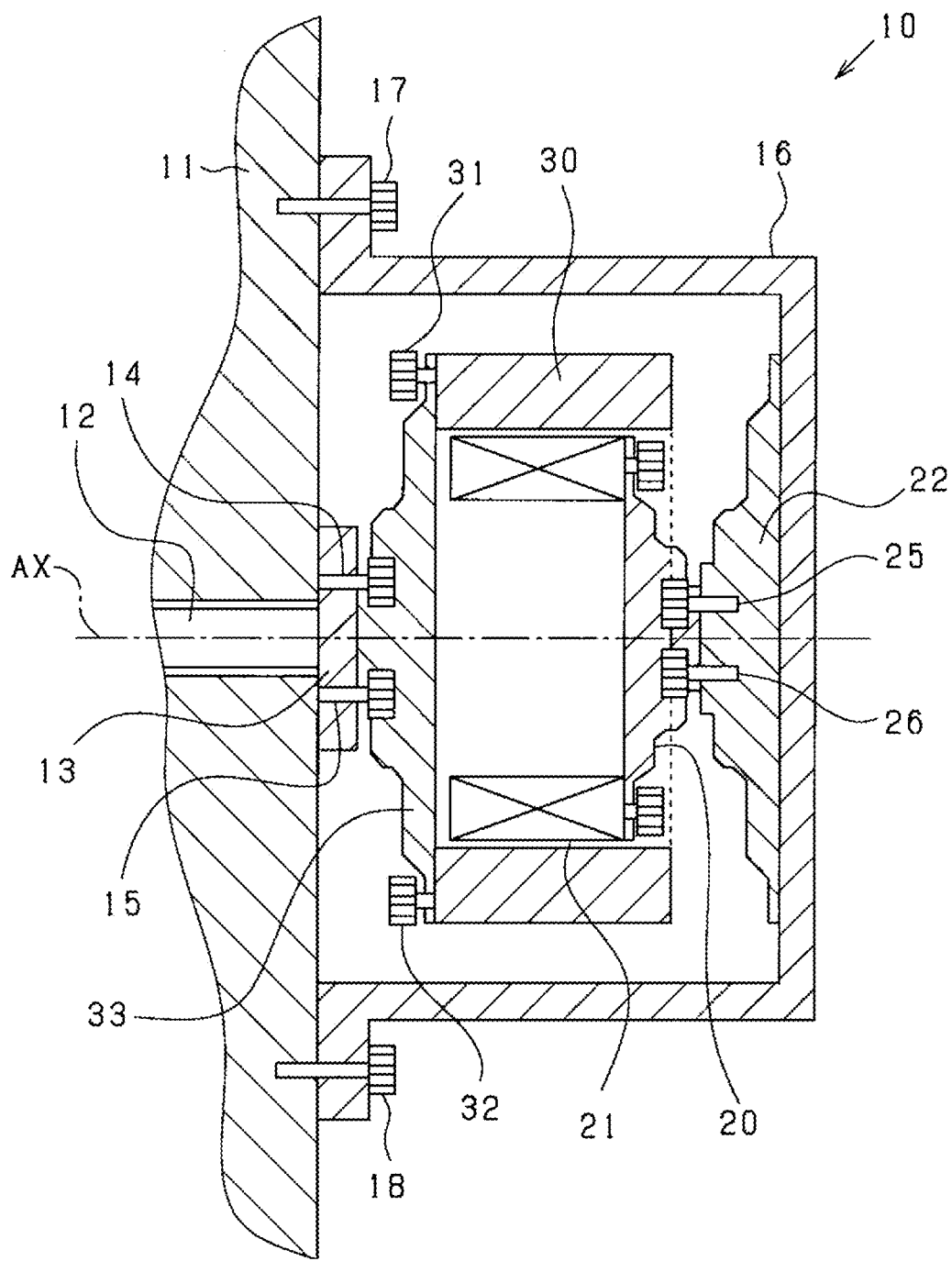
FIG. 1 is an axial cross-sectional view of a motor-generator according to the first embodiment.

A motor-generator 10 is, as illustrated in FIG. 1, secured through a housing 16 to a wall surface 11 of an engine block of an internal combustion engine, which will be referred to simply as an engine, installed in, for example, a vehicle. The motor-generator 10 is also connected to a shaft 12 that is connected to a part of the internal combustion engine. This enables the motor-generator 10 and the part of the internal combustion engine to move together.

The motor-generator 10 includes a stator 20, a stator support 22, a rotor 30, and a rotor support 33. The housing 16 is fastened to the wall surface 11 of the engine block of the engine with bolts 17 and 18, thus being secured to the wall surface 11 of the engine block of the engine.

The wall surface 11 of the engine block and the housing 16 secured thereto provide a chamber thereinside, and the motor-generator 11 is installed in the chamber surrounded by the wall surface 11 and the housing 16.

The housing 16 has inner wall surfaces, and one of the inner wall surfaces, which will be referred to as a facing inner wall surface, is located to face the wall surface 11 of the engine block. The stator support 22 is fixedly mounted to the facing inner wall surface of the housing 16. The stator 11 is fastened to the stator support 22 with bolts 25 and 26, thus being secured thereto.

The shaft 12 is a rotational shaft that rotates around a predetermined axis AX. For example, the crankshaft of the engine can serve as the shaft 12, or another shaft that rotates with rotation of the crankshaft of the engine can serve as the shaft 12. The shaft 12 has a first end 13 and a second end opposite to the first end 13, and the shaft 12 penetrates through the engine block and the wall surface 11 so that the first end 13 of the shaft 12 is mounted on the wall surface 11 and located inside the housing 16.

The rotor support 33 is fastened to the first end 13 of the shaft 12 with bolts 14 and 15, thus being rigidly connected to the first end 13 of the shaft 12. This results in the rotor support 33 being secured to the first end 13 of the shaft 12.

The rotor 30 is fastened to the rotor support 33 with bolts 31 and 32, thus being rigidly connected to the rotor support 33. This results in the rotor 30 being secured to the rotor support 33.

Rigid connection means that an A member and a B member are connected to each other to constitute a one-piece rigid body.

That is, the shaft 12 and the rotor 30 are rigidly connected to each other through the rotor support 30, making it possible for the rotor 30 to rotate with rotation of the shaft 12. The rigid connection between the shaft 12 and the rotor 33 makes it possible to prevent the shaft 12 and the rotor 33 and/or their parts from rattling against each other, thus reducing a rattling noise due to the rattling.

Backlash or play between parts, such as gears, may cause the parts to rattle against each other, resulting in a rattling noise due to the collisions between the parts.

If the shaft 12 and the rotor 30 were not rigidly connected to each other, such as were splined to each other, the shaft 12, to which torque ripples of the engine have been applied, would not rotate with rotation of the rotor 30, resulting in a rattling noise being generated due to the rattling of gears through backlash therebetween.

The stator 20 is disposed inside the rotor 30. The axis AX also serves as the center axis of the stator 20. Each of the stator 20 and the rotor 30 has an annular cylindrical shape around the axis AX, so that the motor-generator 10 serves as a rotary electric machine having the axis AX as its center axis.

The motor-generator 10 is configured as a permanent-magnet motor-generator. Specifically, the motor-generator 10 includes a coil 21 wound in and around the stator 20, and includes unillustrated permanent magnets mounted on or in the rotor 30.

The motor-generator 10 serves as a motor, i.e., a PM motor, to rotate the rotor based on energized coil 21 to accordingly rotatably drive the shaft 12.

Additionally, the motor-generator 10 serves as a power generator to generate an inductive current in the coil 21 based on rotation of the rotor 30 by rotation of the shaft 12.

The first embodiment describes, as the motor-generator 10, a permanent-magnet motor-generator, but the first embodiment is not limited thereto. Specifically, the first embodiment can use an induction motor-generator as the motor-generator 10.

Figure 2:
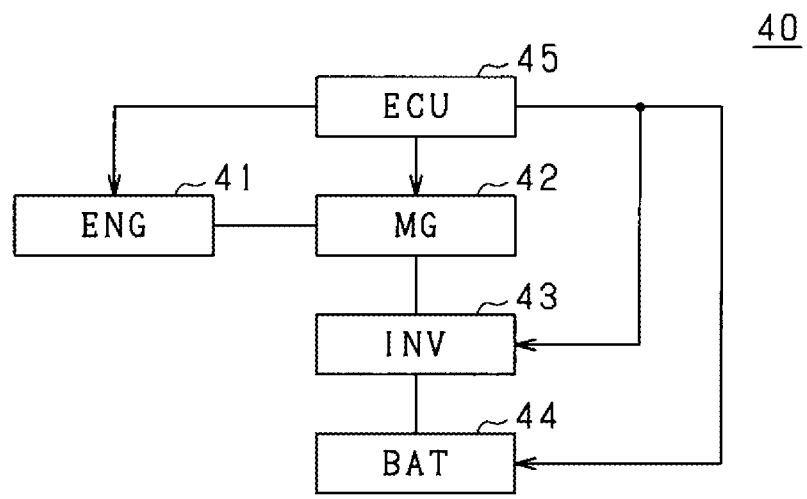
FIG. 2 is a block diagram illustrating a vehicular system equipped with the motor-generator according to the first embodiment.

The motor-generator 10 can be applied to a vehicular system 40 illustrated in FIG. 2.

The vehicular system 40 includes an engine (ENG) 41, a motor-generator (MG) 42, an inverter (INV) 43, a secondary battery (BAT) 44, and a controller (ECU) 45. The motor-generator 10 is used as the motor-generator 42.

As illustrated in FIGS. 1 and 2, the engine, i.e., the internal combustion engine, 41 and the motor-generator 42 are connected to each other such that the shaft 12 and the rotor 30 are secured to each other and rotate with each other.

The engine 41 is designed as, for example, a four-stroke engine configured to repeat the four piston strokes including the intake stroke, the compression stroke, the expansion stroke (combustion stroke), and the exhaust stroke.

Torque generated during the combustion stroke of the engine 41 is transmitted to the crankshaft, i.e., the shaft 12, so that the torque rotatably drives the rotor 30 through the shaft 12. Change in the torque transmitted to the rotor 30 through the shaft 12 generates an inductive current, thus generating electrical power.

The torque generated during four-strokes of the engine 41 may change due to, for example, the inertia of the reciprocating mass of the piston and/or loss during the intake stroke and/or the exhaust stroke.

The inverter 43 is operative to convert direct-current (DC) power supplied from the secondary battery 44 into alternating-current (AC) power, thus supplying the AC power to the motor-generator 42. Additionally, the inverter 43 is operative to convert AC power generated by the motor-generator 42 into DC power, thus supplying the DC power to the secondary battery 44. The controller 45 is configured to independently control each of the engine 41, the motor-generator 42, the inverter 43, and the secondary battery 44.

The engine 41 and the motor-generator 42 are, as illustrated in FIG. 1, configured such that the shaft 12 and the rotor 30 are connected to one another without any flywheel, any gear, and/or any damper therethrough.

Figure 3:
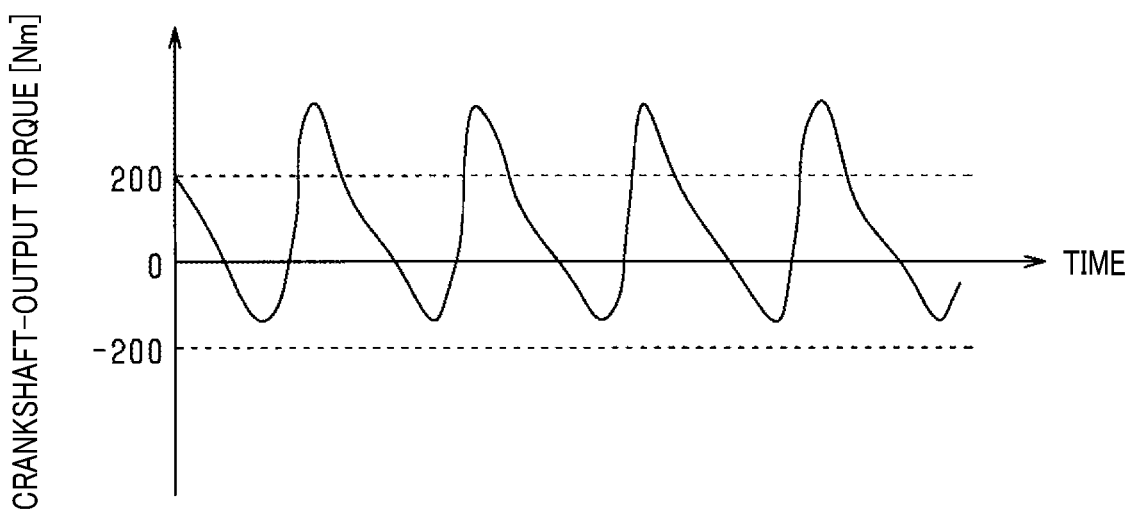
FIG. 3 is a graph illustrating how crankshaft-output torque fluctuates over time.

FIG. 3 illustrates how torque of the engine 41 outputted from the crankshaft of the engine, which will be referred to as crankshaft-output torque, fluctuates over time to exceed 200 Nm while the engine 41 and the motor-generator 42 are connected to each other without a flywheel.

The disclosing persons of the present disclosure have found, based on the results of our earnest studies, that an increase in rotor inertia, which serves as inertia moment of the rotor 30, enables rotational fluctuations of the motor-generator 10 to be reduced.

Note that, in the present specification, the rotational fluctuations mean rotational-speed fluctuations.

The disclosing persons of the present disclosure have inspired, based on the above findings, that adjustment of the rotor inertia enables reduction of noise due to torque ripples and/or rotational fluctuations of the engine, making it possible to establish flywheel-less connection between the engine and the motor-generator 10. The disclosing persons have therefore completed, based on the above inspiration, the present disclosure.

Figure 4:
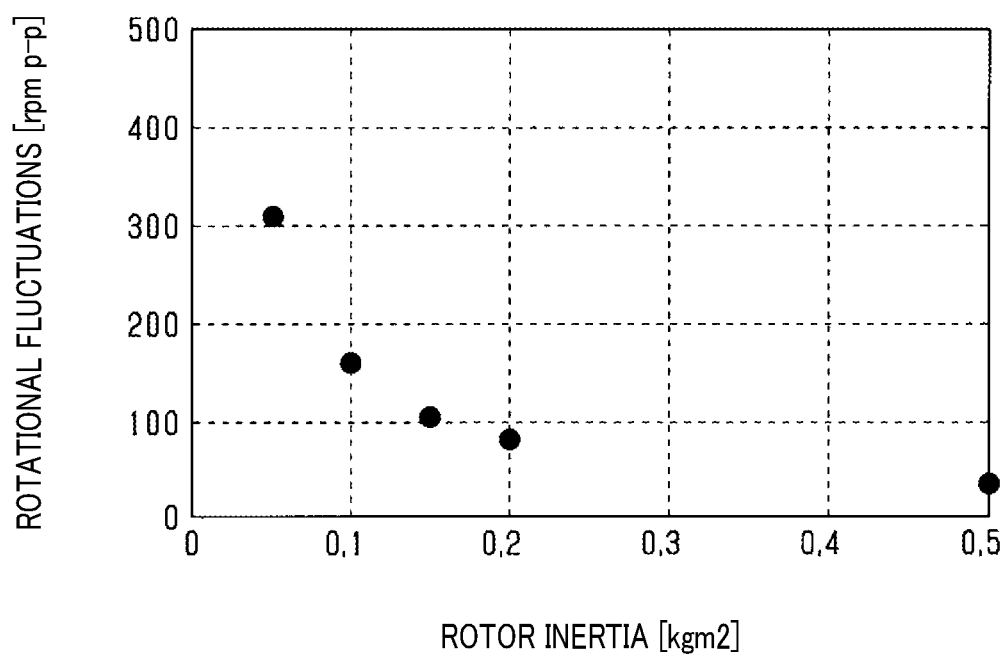
FIG. 4 is a graph illustrating how the rotational fluctuations of the motor-generator have been influenced by rotor inertia.

FIG. 4 is a graph illustrating how the rotational fluctuations of the motor-generator 10 have been influenced by the rotor inertia when the crankshaft-output torque is applied to the shaft 12.

The vertical axis of the graph represents the rotational fluctuations of the motor-generator, which are expressed in "rpm p-p". The unit "rpm p-p" is the combination of (i) the unit of rpm representing the rotational speed and (ii) the unit of p-p representing peak-to-peak.

For example, 200 rpm p-p represents that the rotational speed fluctuates between a positive peak of +100 rpm and a negative peak of −100 rpm inclusive.

The horizontal axis of the graph represents the rotor inertia expressed in kg·m$^2$.

FIG. 4 shows that, the larger the rotor inertia, the smaller the rotational fluctuations.

For example, the rotor 30 designed to have the rotor inertia greater than or equal to 0.1 kg·m$^2$ is enough to reduce the rotational fluctuations upon the motor-generator 10 generating power to be smaller than 200 rpm-pp with the rotational speed of the motor-generator 10 constant.

The amount of decrease in the rotational fluctuations with an increase in the rotor inertia is gradually reduced. For example, FIG. 4 shows that an increase in the rotor inertia from 0.05 kg·m$^2$ to 0.2 kg·m$^2$ results in the amount of decrease in the rotational fluctuations being 200 rpm p-p or more. In contrast, FIG. 4 shows that an increase in the rotor inertia from 0.2 kg·m$^2$ to 0.5 kg·m$^2$ results in the amount of decrease in the rotational fluctuations being the order of 50 rpm p-p.

An excessive increase in the rotor inertia may result in the rate of increase or decrease in the rotational speed of the motor-generator 10 being slower. This may become a factor in reducing the responsivity of the motor-generator 10 when the motor-generator 10 is performing the power generation operation. It is therefore preferable to design the rotor inertia, i.e., the inertia of the rotor 30, to an appropriate value in consideration of (i) the amount of decrease in the rotational fluctuations with an increase in the rotor inertia and (ii) the responsivity of the motor-generator 10 when the motor-generator 10 is performing the power generation operation.

Figure 5:
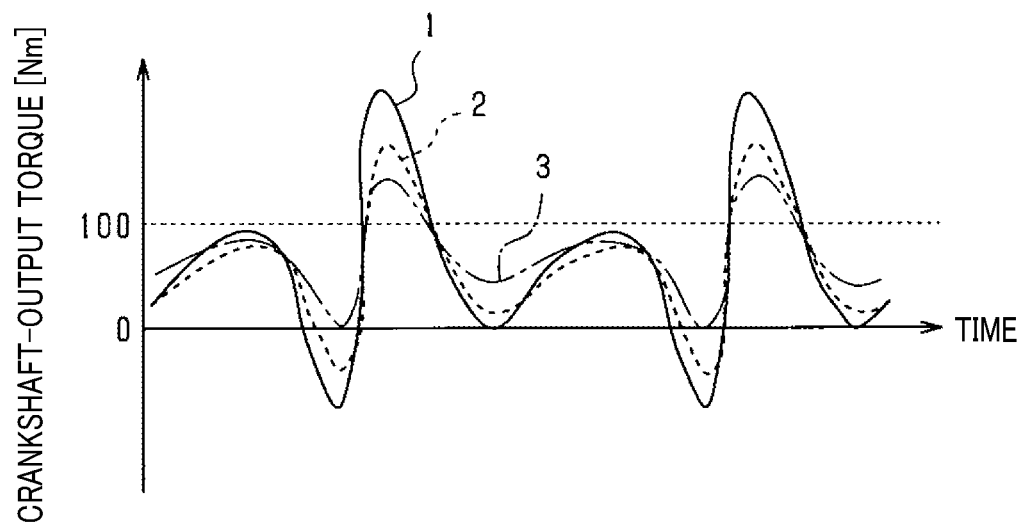
FIG. 5 is a graph illustrating how a time-variable waveform of the crankshaft-output torque has been influenced to change by change of the rotor inertia.

FIG. 5 is a graph illustrating how the time-variable waveform of the crankshaft-output torque has been influenced to change by change of the rotor inertia. For example, FIG. 5 shows (I) A first time-variable waveform, which is a solid curve labeled by 1, of the crankshaft-output torque when change of the rotor inertia is relatively small (II) A second time-variable waveform, which is a dashed curve labeled by 2, of the crankshaft-output torque when change of the rotor inertia is relatively middle (III) A third time-variable waveform, which is a dashed-dotted curve labeled by 3, of the crankshaft-output torque when change of the rotor inertia is relatively large FIG. 5 shows that, the larger the rotor inertia, the smaller the ripples of the crankshaft-output torque.

If the crankshaft-output torque (see the vertical axis of the graph of FIG. 5) fluctuates to cross 0 N·m, i.e., zero-crossing of the crankshaft-output torque occurs, rattling noises may easily occur. From this viewpoint, an increase in the rotor inertia reduces the ripples of the crankshaft-output torque, making it possible to reduce the frequency of the occurrence of the zero-crossing of the crankshaft-output torque. The reduction in the frequency of the occurrence of the zero-crossing of the crankshaft-output torque reduces the rattling noises, resulting in reduction in noise generated from the motor-generator 10.

FIG. 5 also shows that an increase in the rotor inertia in the motor-generator 10 increases rotational energy stored in the rotor 30 based on rotation of the motor-generator 10 through the shaft 12, making it possible to reduce the ripples of the crankshaft-output torque.

Even for the flywheel-less connection between the engine and the motor-generator 10, a sufficient increase in the inertia of the rotor 30 reduces, like flywheel connection between the engine and the motor-generator 10, the torque ripples of the engine and/or the rotational fluctuations of the motor-generator 10. In other words, designing the rotor inertia enables the torque ripples of the engine and/or the rotational fluctuations of the motor-generator 1 to decrease, making it possible for the rotor 30 to alternate such a flywheel.

The rotor 30 illustrated in FIG. 1, which has an adjusted inertia, can serve as an alternative to a flywheel.

For example, the inertia moment, which is expressed by J, of a hollow tubular cylinder can be calculated in accordance with the following formula (1):

$$J=(D^2+d^2) \times M/8 \tag{1}$$

where:

D represents the outer diameter of the hollow tubular cylinder, which is measured in m;

d represents the inner diameter of the hollow tubular cylinder, which is measured in m; and M represents the mass of the hollow tubular cylinder, which is measured in kg.

The inertial moment J is measured in kg·m$^2$.

If the rotor 30 is liken to such a hollow tubular cylinder, it requires an increase in the outer diameter, the inner diameter, and/or the mass of the rotor 30 to increase the inertia of the rotor 30. That is, it requires an increase in the size of the rotor 30 to increase the inertia of the rotor 30. Because the motor-generator 10 is designed as an outer-rotor type motor-generator, so that the rotor 30 serves as an outer rotor 30 arranged to surround the inner stator 20, the size of the motor-generator 10 is substantially identical to the size of the rotor (outer rotor) 30. In contrast, in an inner-rotor type motor-generator, an outer stator is arranged to surround an inner rotor. For this reason, the arrangement of the outer stator around the inner rotor may increase the size of the inner-rotor type motor-generator.

Specifically, as compared with such an inner-rotor type motor-generator, the motor-generator 10 of the first embodiment, which is comprised of the inner stator 20 and the outer rotor 30 arranged to surround the inner stator 20, has a smaller size even if the outer rotor 30 has upsized to ensure a sufficient level of the inertia thereof.

As described above, the motor-generator 10 of the first embodiment includes the stator 20 as an inner stator, and the rotor 30 as an outer rotor arranged to surround the inner stator 20. The rotor 30 of the motor-generator 10 is rigidly connected to the shaft 12 of the engine, so that the rotor 30 rotates together with the shaft 12. The rotor 30 is configured as an outer rotor that serves as an alternative to a flywheel, and is configured to reduce noise due to torque ripples of the engine and/or rotational fluctuations thereof. The above configuration of the motor-generator 10, which is comprised of the outer rotor 30, enables the motor-generator 10 to be connected to the engine without a flywheel.

Additionally, the motor-generator 10 of the first embodiment, which is comprised of the inner stator 20 and the outer rotor 30 arranged to surround the inner stator 20, prevents its size from being excessively larger even if the outer rotor 30 has upsized to ensure a sufficient level of the inertia thereof; the sufficient level of the inertial of the rotor 30 enables the rotor 30 to alternate a flywheel.

The motor-generator 10 of the first embodiment, which employs flywheel-less connection, therefore achieves both reduction in size and reduction in noise.

The motor-generator 10 includes the rotor support 33 and the stator support 22. The rotor 30 and the shaft 12 of the engine are fastened to each other through the rotor support 33 with the bolts 14, 15, 31, and 32, thus being rigidly connected to each other. The rotor support 33 and the bolts 14, 15, 31, and 32 constitute a first fastening member that establishes rigid connection between the motor-generator 10 and the engine.

Additionally, the stator 20 and the wall surface 11 of the engine block of the engine are fastened to each other through the stator support 22 and the housing 16 with the bolts 17, 18, 25, and 26, thus being rigidly connected to each other. The stator support 22 and the bolts 17, 18, 25, and 26 constitute a second fastening member that establishes rigid connection between the motor-generator 10 and the engine.

These first and second rigid members, which rigidly connect the engine and the motor-generator 10, reduces rattling between the engine and the motor-generator 10, making it possible to further reduce noise due to the rattling.

Second Embodiment

Figure 6:
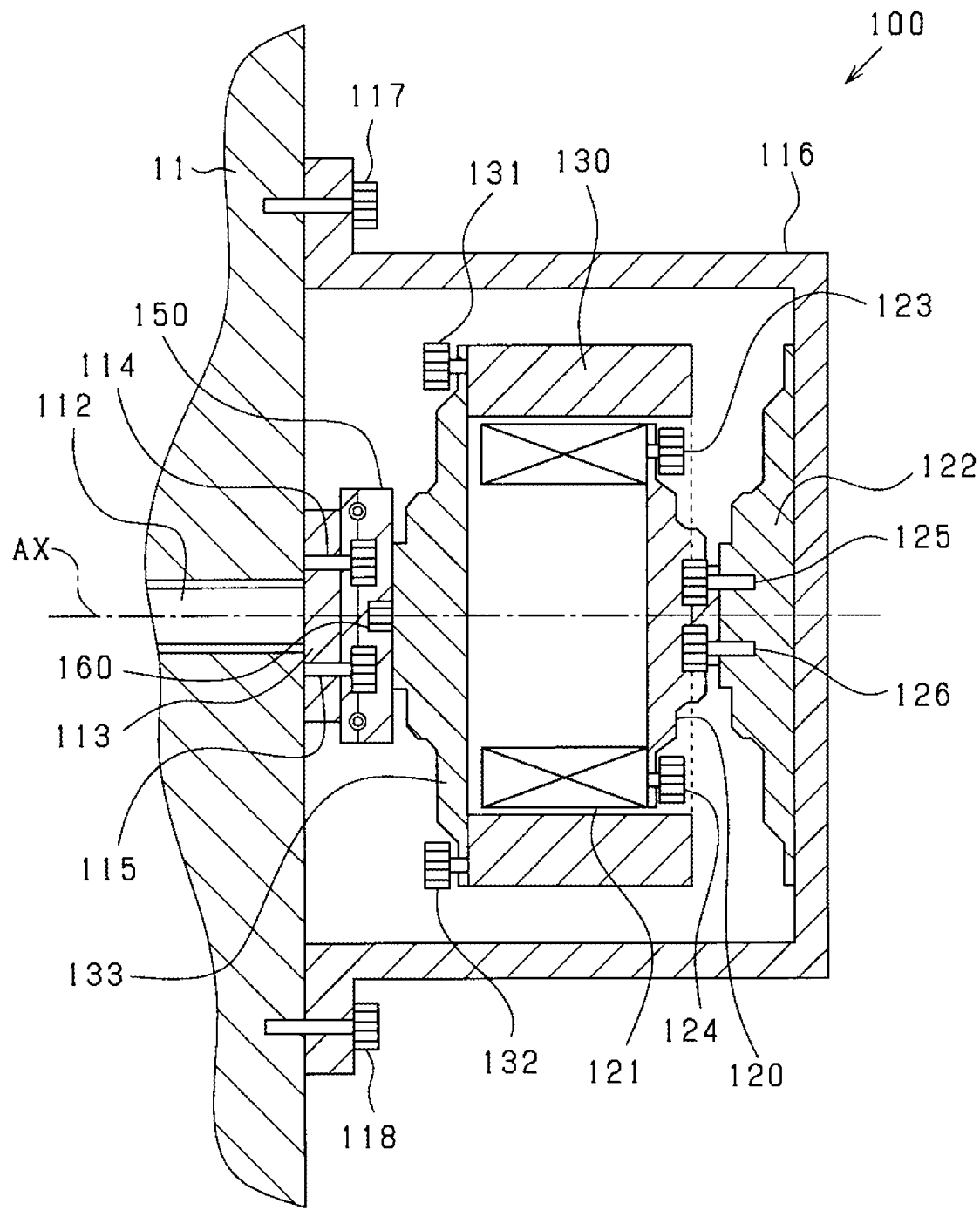
FIG. 6 is an axial cross-sectional view of a motor-generator according to the second embodiment.

A motor-generator 100 according to the second embodiment illustrated in FIG. 6 is different from the motor-generator 10 illustrated in FIG. 1 in the following points. Specifically, the motor-generator 100 includes a rotor support 133 in place of the rotor support 33, and the engine includes a shaft 112 in place of the shaft 12. The shaft 112 has a first end 113 and a second end opposite to the first end 113, and the first end 113 of the shaft 112 penetrating through the engine block and the wall surface 11 is mounted on the wall surface 11 and located inside the housing 16. Additionally, the motor-generator 100 includes a damper 150 interposed between the first end 113 of the shaft 112 and the rotor support 133.

The damper 150 and the rotor support 133 are fastened to each other through a spline joint 160. The damper 150 is also fastened to the first end 113 of the shaft 112 with bolts 114 and 115.

The other components of the motor-generator 100 illustrated in FIG. 6 are substantially identical to those of the motor-generator 10 illustrated in FIG. 1. For this reason, the reference numbers assigned to the other components of the motor-generator 100 are different in the hundreds place from those assigned to the corresponding other components of the motor-generator 10, and therefore descriptions of the other components of the motor-generator 100 are omitted.

The damper 150 is arranged between the shaft 112 and the rotor support 133, and the damper 150 and the rotor support 133 are fastened to each other through the spline joint 160.

The damper 150 is designed as a torsional damper having a function of reducing negative ripples of the crankshaft-output torque of the engine. This function of the damper 150 makes it possible to prevent the engine and the motor-generator 100 and/or their parts from rattling against each other. That is, the damper 150 splined to the engine serves as the first fastening member that fastens the engine and the motor-generator 100 to each other while preventing the engine and the motor-generator 100 and/or their parts from rattling against each other.

The motor-generator 100 equipped with the damper 150 is fastened to the engine while efficiently preventing the engine and the motor-generator 100 and/or their parts from rattling against each other, making it possible to efficiently reduce noise.

The motor-generator 100 of the second embodiment is configured such that the damper 150 is splined to the rotor support 133, and the damper 150 and the shaft 112 are rigidly connected to each other, but this configuration is one example of various configurations. Specifically, the damper 150 and the shaft 112 are splined to each other.

Each of the first and second embodiments achieves the following advantageous benefits.

The motor-generator 10, 100 includes the stator 20, 120 as an inner stator, and the rotor 30, 130 as an outer rotor arranged to surround the inner stator 20, 120. The rotor 30, 130 of the motor-generator 10, 100 is connected to the engine. The rotor 30, 130 is configured as an outer rotor that serves as an alternative to a flywheel, and is configured to reduce noise due to torque ripples of the engine and/or rotational fluctuations thereof. The above configuration of the motor-generator 10, 100, which is comprised of the outer rotor 30, 130, enables the motor-generator 10, 100 to be connected to the engine without a flywheel.

Additionally, the motor-generator 10, 100, which is comprised of the inner stator 20, 120 and the outer rotor 30, 130 arranged to surround the inner stator 20, 120, prevents its size from being excessively larger even if the outer rotor 30, 130 has upsized to ensure a sufficient level of the inertia thereof; the sufficient level of the inertial of the rotor 30, 130 enables the rotor 30, 130 to alternate a flywheel. This results in the motor-generator 10, 100, which employs flywheel-less connection, therefore achieving both reduction in size and reduction in noise.

The motor-generator 10, 100 can include at least one of the first and second fastening members that fastens the rotor 30, 130 to the engine while preventing the engine and the motor-generator 10, 100 and/or their parts from rattling against each other, making it possible to efficiently reduce noise due to the rattling.

Each of the first and second fastening members can be configured to rigidly connect the rotor 30, 130 to the engine.

The first fastening member includes the rotor support 33 and the bolts 14, 15, 31, and 32, and the outer rotor 30, 130 and the shaft 12, 112 of the engine are fastened to each other through the rotor support 33, 133 with the bolts 14, 15, 31, and 32, thus being rigidly connected to each other.

The second fastening member includes the stator support 22 and the bolts 17, 18, 25, and 26, and the stator 20, 120 and the wall surface 11 of the engine block of the engine are fastened to each other through the stator support 22, 122 and the housing 16 with the bolts 17, 18, 25, and 26, thus being rigidly connected to each other. A drive coil 21, 121 can be mounted to the inner stator 20, 120.

The first fastening member of the motor-generator 100 can include a torsional damper, such as the damper 150. The torsional damper can be interposed between the shaft 12, 122 of the engine and the rotor support 133 of the motor-generator 100, and the torsional damper can be splined to the rotor support 133 and/or the shaft 12, 122 of the engine.

The torsional damper reduces negative ripples of the crankshaft-output torque of the engine, thus preventing the engine and the motor-generator 100 and/or their parts from rattling against each other. This therefore makes it possible to efficiently reduce noise due to the rattling.

The present disclosure can be applied to motor-generators or motor generators, each of which is installable in an apparatus driven based on power supplied from a secondary battery. The present disclosure can be suitably applied to motor-generators, each of which is installable in a stationary power generator or in a mobility device. The mobility device can include, for example, a vehicle, such as a passenger vehicle, a commercial vehicle, a small-size vehicle, a two-wheel vehicle, or a tow vehicle. The mobility device can also include a vessel or an aerial vehicle.

Such a mobility device, which includes a motor-generator according to the present disclosure, can be configured such that the motor-generator operates as a motor to drive based on supplied power to accordingly generate drive power, thus moving based on the drive power. The stationary power generator can be configured to supply power generated by a motor-generator according to the present disclosure to a secondary battery, thus charging the secondary battery. Additionally, the stationary power generator can be configured to calculate the sum of the power generated by the motor-generator and power discharged from the secondary battery, and supply the calculated power to any device via a power converter for converting DC power into AC power. That is, the stationary power generator can be used as a commercial power source.

The first fastening member of the motor-generator 100 can include a torsional damper, such as the damper 150. The torsional damper can be interposed between the shaft 12, 112 of the engine and the rotor support 133 of the motor-generator 100, and the torsional damper can be splined to the rotor support 133 and/or the shaft 12, 112 of the engine.

While the illustrative embodiments of the present disclosure have been described herein, the present disclosure is not limited to the embodiments and configurations described herein. Specifically, the present disclosure can include any and all modified embodiments and modifications within the range of equivalency of the present disclosure. Additionally, various combinations of the embodiments, modified combinations to which at least one element has been added, or modified combinations from which at least one element has been eliminated are within the scope of the present disclosure and/or the patentable ideas of the present disclosure.

The invention claimed is:

1. A motor-generator configured to use no flywheel connection to an internal combustion engine, the motor-generator comprising:
    an inner stator; and
    an outer rotor arranged to surround the inner stator, the outer rotor being connected to the internal combustion engine without a flywheel, the outer rotor serving as an alternative to the flywheel and being configured to reduce noise due to at least one of torque ripples of the internal combustion engine and rotational fluctuations of the motor-generator, wherein
    the outer rotor has inertia serving as inertia moment thereof,
    the internal combustion engine includes a shaft, and
    when the shaft outputs torque having ripples that exceed 200 Nm, the inertia of the outer rotor, being greater than or equal to 0.1 kg·m$^2$, maintains rotational fluctuations of the motor generator at or below 200 rpm peak-to-peak.

2. The motor-generator according to claim 1, further comprising:
    a fastening member interposed between the internal combustion engine and at least one of the outer rotor and the inner stator and configured to fasten the internal combustion engine and the at least one of the outer rotor and the inner stator to each other while reducing rattling therebetween.

3. The motor-generator according to claim 2, wherein:
    the fastening member is configured to rigidly connect between the internal combustion engine and the at least one of the outer rotor and the inner stator.

4. The motor-generator according to claim 3, further comprising:
    a drive coil mounted to the inner stator,
    wherein:
    the internal combustion engine includes a shaft and an engine block having a wall surface; and
    the fastening member comprises:
        a first fastening member interposed between the outer rotor and the shaft of the internal combustion engine and comprising a rotor support, the first fastening member being configured to fasten the outer rotor and the shaft of the internal combustion engine to each other through the rotor support while reducing rattling therebetween; and
        a second fastening member interposed between the inner stator and the wall surface of the engine block of the internal combustion engine and comprising a stator support, the second fastening member being configured to fasten the inner stator and the wall surface of the engine block of the internal combustion engine to each other through the stator support while reducing rattling therebetween.

5. The motor-generator according to claim 2, wherein:
    the fastening member comprises a torsion damper.

6. The motor-generator according to claim 5, wherein:
    the internal combustion engine includes a shaft; and
    the torsion damper is interposed between the shaft of the internal combustion engine and the outer rotor and splined to at least one of the outer rotor and the shaft of the internal combustion engine.

7. The motor-generator according to claim 6, wherein the torsion damper is directly bolted to the shaft of the internal combustion engine on a first side of the torsion damper and directly connected through a spline joint to the fastening member on a second side of the torsion damper.

8. The motor-generator according to claim 1, wherein:
    the outer rotor has a characteristic that, the larger the inertia of the outer rotor, the smaller the rotational fluctuations of the motor-generator.

9. The motor-generator according to claim 1, wherein:
    the shaft has opposing first and second ends, and the outer rotor is rigidly connected to the first end of the shaft.

10. A power generator comprises a motor-generator according to claim 1.

11. A mobility device comprises a motor-generator according to claim 1.

\* \* \* \* \*